United States Patent [19]
Reynolds et al.

[11] Patent Number: 5,710,696
[45] Date of Patent: *Jan. 20, 1998

[54] CONTROLLABLE CONVERTER POWER SUPPLY

[75] Inventors: Jon O. Reynolds; Michael D. Madsen, both of Appleton, Wis.

[73] Assignee: Illinois Tool Works Inc., Glenview, Ill.

[*] Notice: The term of this patent shall not extend beyond the expiration date of Pat. No. 5,444,356.

[21] Appl. No.: 483,732

[22] Filed: Jun. 7, 1995

Related U.S. Application Data

[63] Continuation of Ser. No. 206,057, Mar. 3, 1994, Pat. No. 5,444,356.

[51] Int. Cl.$^6$ .............................. H02M 5/45; H02M 3/24; H02M 7/5387
[52] U.S. Cl. .............................. 363/37; 363/98; 363/132
[58] Field of Search .............................. 323/266, 282, 323/344; 363/37, 98, 132, 17, 89

[56] References Cited

U.S. PATENT DOCUMENTS

| | | | |
|---|---|---|---|
| 3,193,002 | 7/1965 | Steigerwald et al. | 165/139 |
| 3,300,683 | 1/1967 | Weishaar . | |
| 3,330,933 | 7/1967 | Maklary . | |
| 3,780,258 | 12/1973 | Iceland et al. | 219/130.4 |
| 3,894,210 | 7/1975 | Smith et al. . | |
| 3,999,034 | 12/1976 | Barhorst . | |
| 4,038,515 | 7/1977 | Risberg . | |
| 4,180,720 | 12/1979 | Barhorst . | |
| 4,485,293 | 11/1984 | Tabata et al. | 219/130.31 |
| 4,502,104 | 2/1985 | Mitchell | 363/26 |
| 4,577,267 | 3/1986 | Juutilainen | 363/19 |
| 4,639,844 | 1/1987 | Galio et al. | 363/17 |
| 4,737,901 | 4/1988 | Woodward | 363/43 |
| 4,876,433 | 10/1989 | Kashima et al. . | |
| 4,877,941 | 10/1989 | Honma et al. | 219/130.21 |
| 4,884,183 | 11/1989 | Sable | 363/41 |
| 4,916,380 | 4/1990 | Barroughs | 323/282 |
| 4,963,715 | 10/1990 | Tuttle . | |
| 5,066,900 | 11/1991 | Bassett . | |
| 5,070,294 | 12/1991 | Nochi . | |
| 5,220,151 | 6/1993 | Terayama et al. . | |
| 5,408,067 | 4/1995 | Crouse et al. | 363/41 |
| 5,436,550 | 7/1995 | Arakawa | 323/222 |
| 5,444,356 | 8/1995 | Reynolds et al. | 219/449 PS |
| 5,615,095 | 3/1997 | Reynolds et al. | 363/37 |

FOREIGN PATENT DOCUMENTS

| | | |
|---|---|---|
| 0 438 323 A1 | 7/1991 | European Pat. Off. . |
| 0 580 919 A1 | 2/1994 | European Pat. Off. . |

OTHER PUBLICATIONS

Welding Handbook, Chapter 3, Gas Tungsten Arc Welding, pp. 74–107, American Welding Society (1991).

*Primary Examiner*—Peter S. Wong
*Assistant Examiner*—Bao Q. Vu
*Attorney, Agent, or Firm*—George R. Corrigan

[57] ABSTRACT

In accordance with the present invention a power supply for providing an ac/dc output to a load is disclosed. The power supply includes a first source of dc power and an inverter that provides an ac output to the load. A second source of dc power is provided and selectably connects the first and second sources of dc power in series with the load when the output current reverses. In one embodiment the power sources are connected in series with every output current reversal. The first source of dc power is controllable and the magnitude of the dc current is responsive to a current reference signal. A control circuit provides the current reference signal, wherein the current reference signal is pulsed immediately prior to the ac output reversing polarity. The first source of dc power source preferably includes a buck converter that is switched at a variable frequency, depending upon the desired output current. In the event the user selects either an ac or dc electrode negative output a period of electrode positive dc energy is provided at start up to help establish the arc.

14 Claims, 4 Drawing Sheets

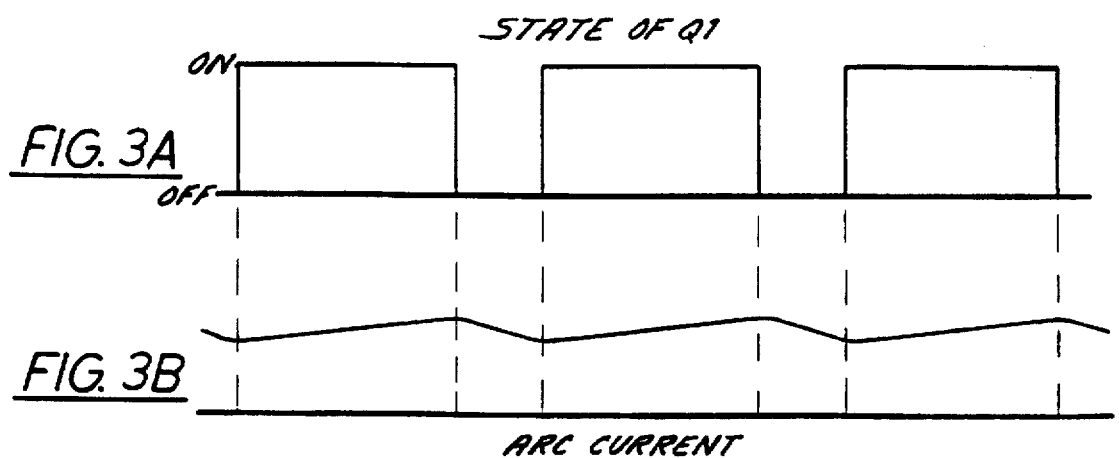
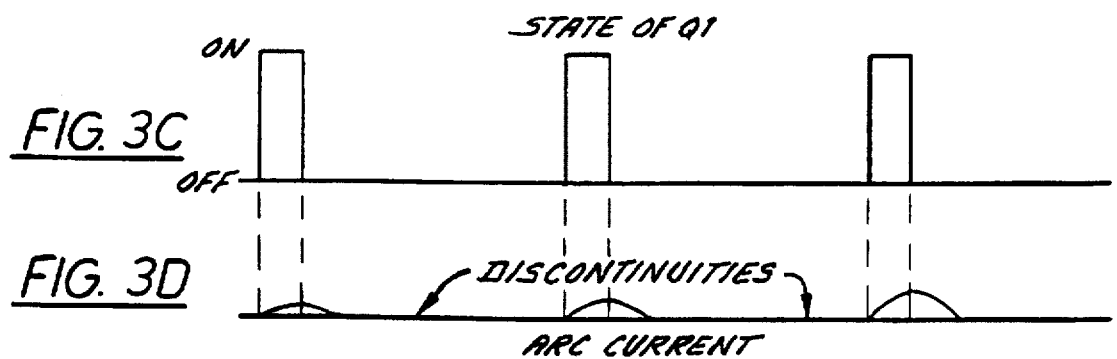
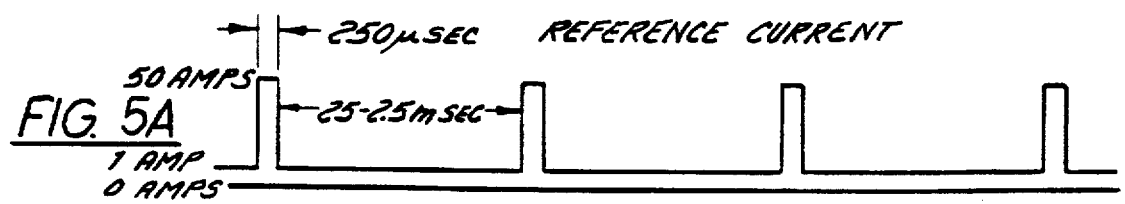
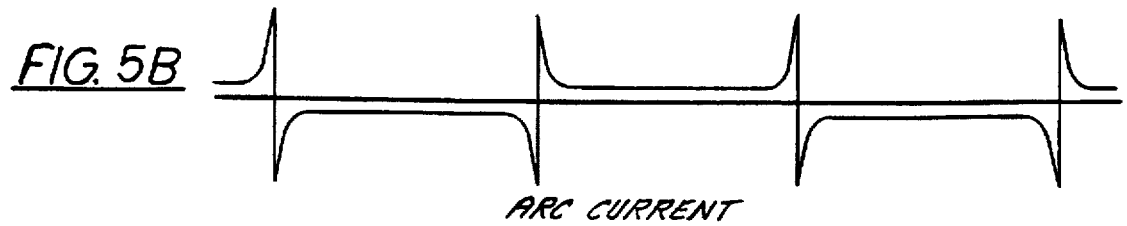

CONTROLLABLE CONVERTER POWER SUPPLY

This application is a continuation of Ser. No. 08/206,057 filed Mar. 3, 1994 now U.S. Pat. No. 5,444,356.

FIELD OF THE INVENTION

The present invention relates generally to controllable inverter power supplies and, in particular to a method and apparatus for providing a stabilized arc when GTAW welding.

BACKGROUND OF THE INVENTION

Gas tungsten arc welding (GTAW), also called tungsten inert gas (TIG) welding, is a well known method for welding metals, in particular aluminum and magnesium. A description of GTAW, including the problems associated with welding aluminum and magnesium, may be found in *Welding Handbook*, Chapter 3, Gas Tungsten Arc Welding, pages 74–107, 1991, published by the American Welding Society.

It is well known in GTAW to use an ac squarewave power source, which is particularly suited for welding aluminum and magnesium. An ac squarewave power source provides a single phase output having a straight polarity (electrode negative) half-cycle and reverse polarity (electrode positive) half-cycle, with a rapid transition between half cycles.

In GTAW welding a squarewave having independently adjustable duration of the two half-cycles (positive and negative) is desirable. In other words, it is desirable to have the positive half cycle duration be controllable to be longer or shorter in time than the negative half-cycle. Hereinafter independent control of the positive and negative half-cycle widths is called adjustable balance. It is also desirable to independently control the amplitude of the two half-cycles, i.e. control the positive half-cycle amplitude to be greater or less than the negative half-cycle amplitude (hereinafter independent amplitude control).

One ac squarewave power source is described in U.S. Pat. No. 4,038,515, (the '515 patent) issued Jul. 26, 1977 to Robert L. Risberg. The device disclosed in the '515 patent uses a single phase input and provides an ac squarewave welding current output, with adjustable balance, i.e. the duration of the electrode positive and electrode negative half-cycles may be adjusted with respect to one another.

However, a power supply that uses a single phase input such as the power supply of the '515 patent requires a very large single phase input current requirement. Such a large single phase current draw is undesirable for industrial sites having three-phased power because it unbalances the power lines.

There are prior art GTAW power supplies using an inverter with a three phase input that have the capability of independent control of the output half-cycles. However, many prior art GTAW inverter power supplies directly rectify the input line. Thus, to design inverters for multiple input voltages operating directly from the power lines requires compromises in the design, such as dual inverters with a series parallel connection, or over current and over voltage ratings on the power components to be re-linkable for the various inputs. Moreover, such designs provide an input power factor that is highly capacitive. Such an input power factor can cause neutral unbalance and line notching. Accordingly, it is desirable to provide an inverter for GTAW that provides a constant secondary voltage, regardless of the input voltage and that provides a relatively high power factor for a welding power source.

There are additional problems with known inverter GTAW power supplies. Inverter power supplies for GTAW generally provide a substantially triangular wave shape load current. Due to this triangular wave shape, in a welding application, or any other application where wide range of output currents is required, it can be costly to size the output inductor to both the minimum and maximum current required by the load, unless current discontinuities can be accommodated.

For example, a welding power supply may be required to go from 20 amps or less to 300 amps or more. In order to accommodate a low current, an inductor must be very large. It is costly to provide an inductor that will accommodate this wide range of currents, without causing discontinuities in the output current. Moreover, a small inductor is desirable for applications which require pulsing and output because a large inductance will cause the slewing rate of the output to be slow, adversely affecting the shape of pulsed or squarewave outputs.

Unfortunately, the discontinuities in the output current will appear as an arc outage which is generally not acceptable in GTAW. Accordingly, it is desirable to provide an inverter power supply for GTAW that is capable of providing a wide range of output currents, yet does not provide output current discontinuities and still does not require the use of a costly large inductor.

When providing a GTAW inverter power supply it is desirable to provide the user with the option of selecting straight polarity, reverse polarity or alternating polarity welding. Such a machine has a wider range of applications and is more desirable to the purchaser. It is well known in the prior art that it is difficult to start an arc when the electrode is negative. Conversely, when the electrode is positive the arc will start much easier. However, most dc GTAW is done with the electrode negative, when it is difficult to start.

Accordingly, it is desirable to provide a GTAW inverter power supply that provides an arc starting capability wherein the arc is started with a brief electrode positive polarity followed by a rapid reversal to electrode negative polarity for the welding process. Additionally, when using ac GTAW for the reasons stated above it is desirable to provide an extended electrode positive period in order to facilitate arc starting.

It is also well known in the art that in ac GTAW the arc extinguishes with every current reversal. When the reversal is in the direction of electrode emitting (from electrode positive to electrode negative), the arc will reignite without much difficulty because of the thermionic state of the electrode. However, when the reversal is to the workpiece emitting (from electrode negative to electrode positive), arc reignition problems are encountered. The workpiece is generally below thermionic temperature. Also, the molten weld pool is very clean metal due to the ionic bombardment during past electrode positive half cycles. Both of these factors contribute to difficulty in reestablishing the electrode positive half cycle.

One way the prior art has compensated for this difficulty is by providing high frequency overlays. However, there are many problems associated with such high frequency overlays, one being that high frequency can provide undesirable noise which adversely affects the operation of control circuits, telecommunication equipment and computer equipment. Accordingly, it is desirable to provide a GTAW power supply that will provide for arc starting (stabilizing) when trying to reestablish the electrode positive half cycle without the use of superimposed high frequency.

An additional problem with inverter power supplies is that a considerable amount of acoustic noise is generated by current reversal. Moreover, this acoustic noise is greater for greater welding currents. Accordingly, it is desirable to provide a GTAW power supply that will provide for a lower output current immediately before current reversal.

Inverter power supplies will have a distributed (parasitic) inductance in the load (from the weld cables and arc e.g.). This parasitic inductance will slow the transition at current reversals, adversely affecting machine performance. A high forcing voltage will cause a rapid current reversal. However, a high forcing voltage may cause damage to switches in the inverter. Thus it is desirable to provide a forcing voltage sufficiently high to cause a smooth and fast current reversal, but not so high as to damage switches.

Finally, it is well known that there is an additional safety factor with respect to ventricular fibrillation, the major cause of electrocution, of dc when compared to ac. This factor is given in IEC 479 as 3.75. Accordingly, it is desirable to provide a GTAW power supply that provides a dc voltage at the terminals when not welding or when the power source is at open circuit.

SUMMARY OF THE PRESENT INVENTION

According to one aspect of the present invention a power supply for providing an ac output to a load is provided. The power supply includes a first source of dc power and an inverter that receives the dc power and provides an ac output to the load. A second source of dc power is provided with at least one controllable switch that connects the first and second sources of dc power in series with the load. In one embodiment the power sources are connected in series with every output current reversal.

According to a second aspect of the invention a power supply for providing an ac output to a load includes a transformer and a rectifier connected across the transformer. A capacitor is connected across the rectifier to provide a substantially dc voltage. A converter is connected across the capacitor to produce a substantially dc current having a selectable magnitude as an output. An invertor receives the substantially dc current and provides an ac output to the load. A second source of dc voltage is provided and the converter includes a switch capable of connecting the substantially dc voltage and the second source of dc voltage in series with the load.

A third aspect of the invention is a power supply for providing an ac output to a load. The power supply includes a controllable source of dc current whose magnitude is responsive to a current reference signal. A control circuit provides the current reference signal, wherein the current reference signal is pulsed immediately prior to the ac output reversing polarity.

Yet another aspect of the invention is a buck converter comprised of a source of dc voltage provided between first and second buses. At least one switch having a control input is connected to the first bus and a current gate is connected between the switch and the second bus. At least one inductor is connected at one end to the node common to the switch and the current gate, and the output of the converter is across the second bus and the other end of the inductor. A variable frequency saw tooth wave generator is connected to the control input, and the switch is turned on at the frequency of the saw tooth wave. The frequency of the wave is chosen to be inversely related to the desired current output magnitude.

In accordance with a final aspect of the invention an ac/dc GTAW power supply for providing an output to an arc comprises a dc source of current and an inverter that inverters the dc current to provide an ac output, or a dc output of either polarity to the arc. In the event the user selects either an ac or dc electrode negative output a period of electrode positive dc energy is provided at start up to help establish the arc.

Other principal features and advantages of the invention will become apparent to those skilled in the art upon review of the following drawings, the detailed description and the appended claims.

BRIEF DESCRIPTION OF THE DRAWINGS

FIGS. 3A–3D depicts waveforms of the load current and switch state of an inverter constructed according to the present invention;

FIGS. 5A and 5B show waveforms of the reference current signal and the output current of the circuit of FIG. 4.

Figure 1:
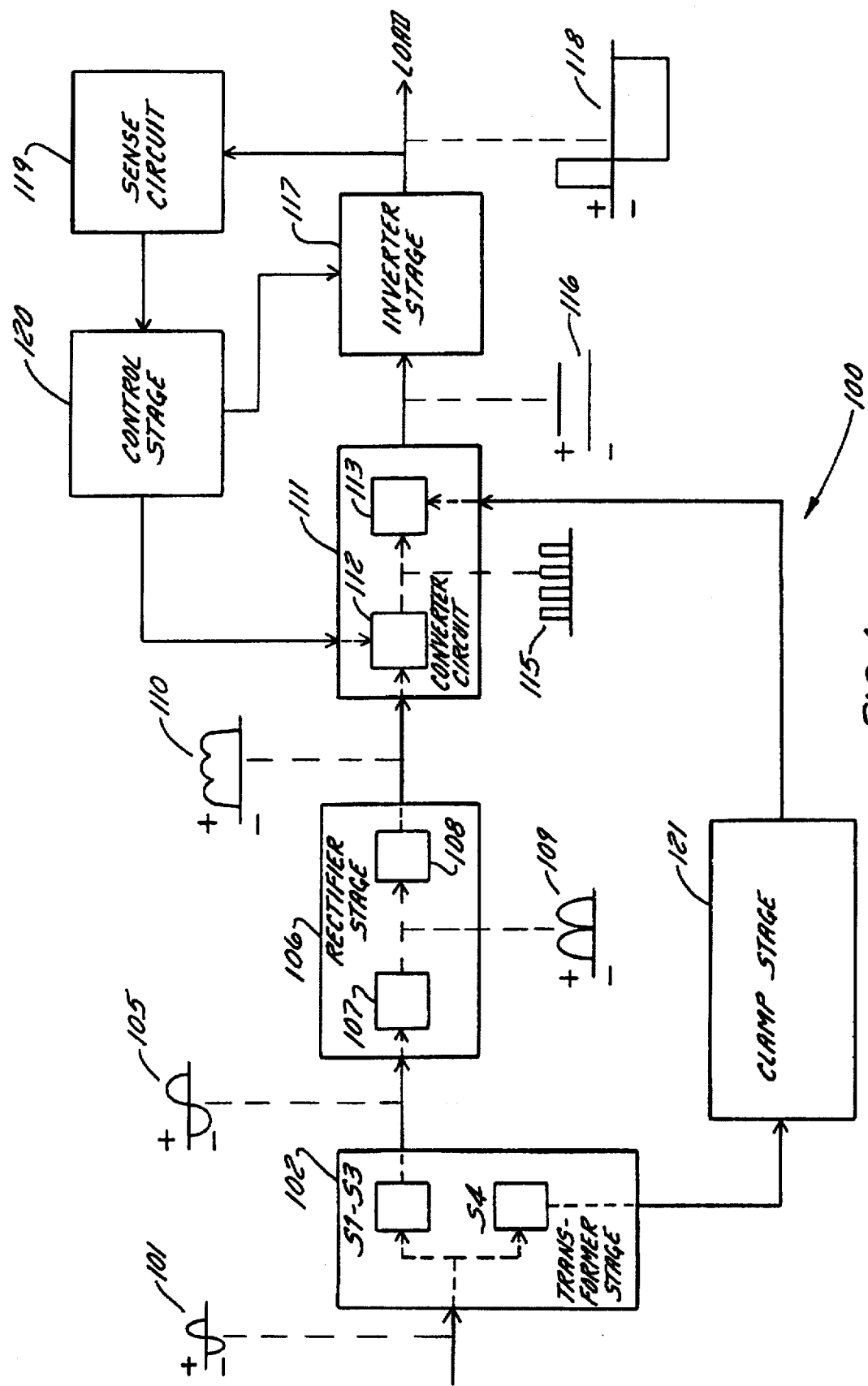
FIG. 1 is a block diagram of an ac/dc power supply constructed according to the present invention.

Before explaining at least one embodiment of the invention in detail, it is to be understood that the invention is not limited in its application to the details of construction and the arrangement of the components set forth in the following description or illustrated in the drawing. The invention is capable of other embodiments or being practiced or carried out in various ways. Also, it is to be understood that the phraseology and terminology employed herein is for the purpose of description and should not be regarded as limiting.

DETAILED DESCRIPTION OF A PREFERRED EXEMPLARY EMBODIMENT

The present invention is directed primarily to an inverter power supply for use in ac or dc GTAW welding. Referring to FIG. 1, a block diagram of a preferred embodiment of a GTAW power supply 100 is shown. Additionally, waveforms between and within various stages of GTAW power supply 100 are shown.

As will be described in detail below, GTAW power supply 100 provides an output suitable for ac or dc GTAW welding. In the ac mode GTAW power supply 100 provides an output having adjustable balance and independent amplitude control. Moreover, even at low currents discontinuities in the load are avoided. Also, as the current reverses from one polarity to the other, a burst of energy is provided to help re-establish the arc and avoid arc instability. Similarly, in the dc electrode negative mode GTAW power supply 100 provides a short burst of electrode positive current to start the arc.

As shown on FIG. 1 an input 60 Hz ac supply 101 is provided to a transformer stage 102. Transformer stage 102 includes a plurality of main secondary windings S1–S3 and a clamp secondary winding S4. Input supply 101 is a high voltage, low current source and is transformed to a 60 Hz ac low voltage, high current, output 105 through main secondary windings S1–S3. Of course as one skilled in the art will recognize the frequency may be something other than 60 Hz for both the input and the output.

Low voltage, high current, output 105 is provided to a rectifier stage 106 which includes a diode bridge 107 and a capacitor 108. Diode bridge 107 receives 60 Hz low voltage, high current output 105 and rectifies it to a rectified dc signal 109. Rectified dc signal 109 is received by capacitor 108, which provides a filtered dc signal 110 having a magnitude of approximately 85 V. In practice capacitor 108 may be more than one capacitor, reducing costs and improving performance. In alternative embodiments transformer stage 102 and rectifier stage 106 may be replaced by other components which provide a source of dc current.

Filtered dc signal 110 is received by a buck converter stage 111 (also called a switching regulator) which includes a switch 112 and an inductor 113. Switch 112 receives filtered dc signal 110 and provides a chopped dc signal 115, preferably having a frequency in the tens of Khz range. As one skilled in the art should recognize, the frequency of chopping could vary widely, depending upon the particular application needed and the components used to perform the switching. Chopped dc signal 115 is provided to inductor 113 which provides a smoothed dc signal 116 as an output. In practice switch 112 may be implemented using a variety of semiconductor switches, including MOSFETs, and inductor 113 may be more than one inductor. Smoothed dc signal 116 has a variable magnitude, depending upon the magnitude of filtered dc signal 308 and the switching of buck converter stage 111.

Smoothed dc signal 116 is provided to an inverter stage 117, which includes IGBTs or other semiconductor switches in the preferred embodiment. Inverter stage 117 inverts its input and provides an ac output 118, having variable frequency, adjustable balance and independently controlled amplitude. The frequency and width of output 118 are controlled by the switching of inverter stage 117. The magnitude of output 118 is dependent on the magnitude of smoothed dc signal 116, which in turn is controlled by the switching of buck converter stage 111. When operating in the dc mode output inverter stage 117 is controlled to provide a constant polarity dc output.

The magnitude, duration and frequency of output 118 is sensed by a sense circuit 119. Sense circuit 119 provides that information to a control circuit 120. Control circuit 120 provides switching signals to switch 112 to control the magnitude of smoothed dc signal 116 and, consequently, output 118. Control circuit 120 also provides switching signals to inverter stage 117 to control the frequency and balance of output 118.

Clamp secondary S4 is provided to help protect stage 117. Clamp secondary S4 transforms input 101 to a 120 volt, low current signal and provides it to a clamp stage 121. The output of clamp stage 121 is a filtered dc signal of about 165 volts. As will be explained in detail below with respect to FIG. 4, clamp stage 121 effectively clamps the voltage applied to IGBTs in inverter stage 117 to a safe level. Thus, clamp stage 121 protects IGBTs in inverter stage 117.

Figure 2:
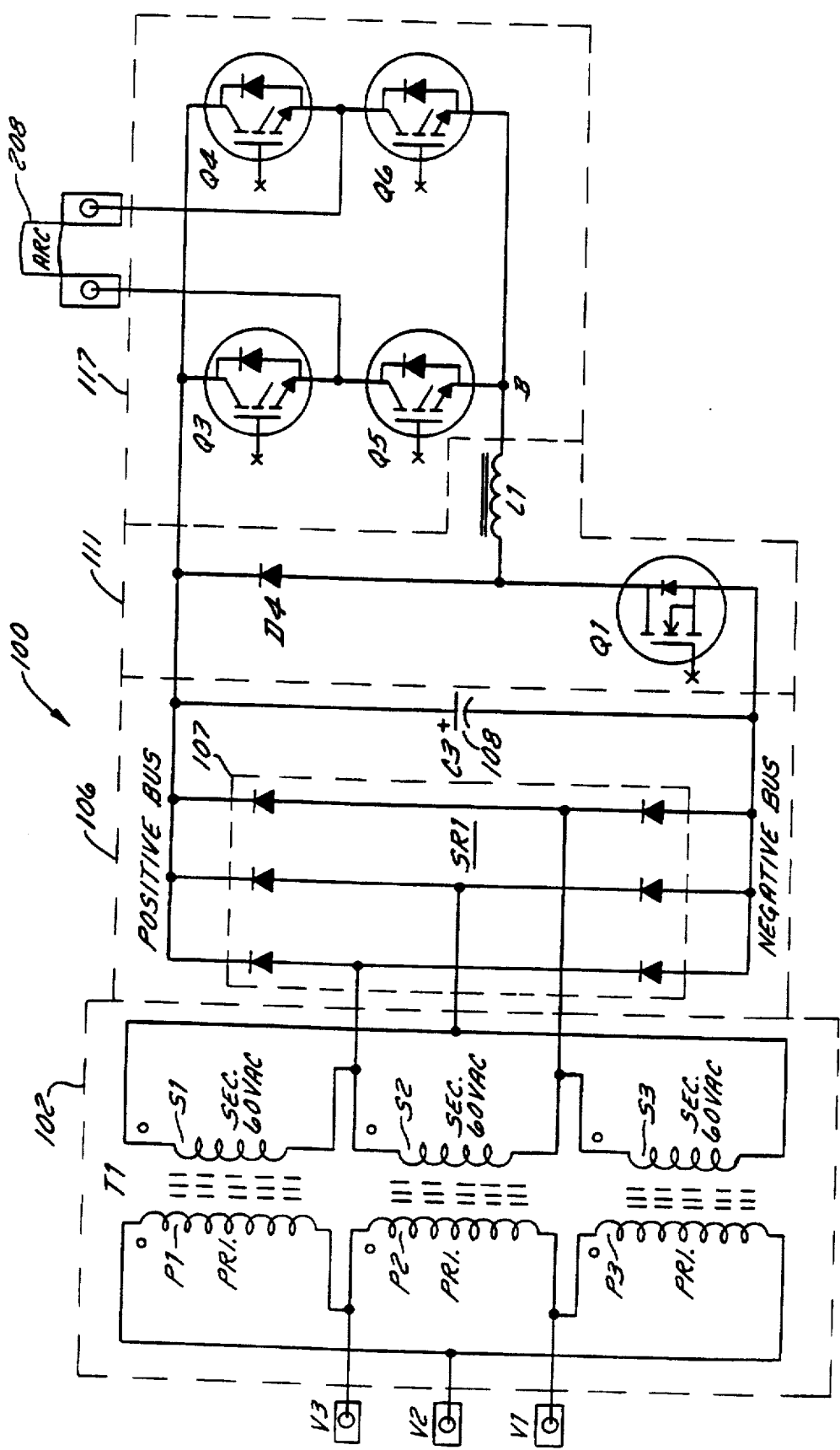
FIG. 2 is a circuit diagram of a preferred embodiment of the inverter power supply constructed according to the present invention.

Referring now to FIG. 2, a circuit diagram of one embodiment of GTAW power supply 100 is shown. The embodiment of FIG. 2 has the stages of FIG. 1, except clamp secondary S4 and clamp stage 121. Sense circuit 119 and control circuit 120 are used in the embodiment of FIG. 2, but are not shown.

The circuit of FIG. 2 includes transformer stage 102, rectifier stage 106, buck converter stage 111, and inverter stage 117. Transformer stage 102 includes a transformer T1, which has a plurality of windings P1–P3 and secondary windings S1–S3. Transformer stage 102 is designed with some primary/secondary leakage reactance in order to obtain a high power factor. For example, using a primary/secondary leakage reactance in the range of 1.0–1.5 millihenrys at 230 V, a power factor of 0.94 is obtained. Preferably, a power factor of at least 0.90 is obtained.

Primary windings P1–P3 receive as an input three-phase input signal 101 (FIG. 1) on a plurality of input terminals V1–V3. As shown in FIG. 2, a three-phase input and three-phase transformer is utilized. However, as one skilled in the art will readily recognize a single-phase input and single-phase transformer could also be used.

Secondary windings S1–S3 are designed to produce an ac output of 60 V each. GTAW power supply 100 can be designed for any of a variety of standard voltages by providing a different primary winding depending upon the input voltage. For example, the primary windings may be designed to accept any voltages, such as 200, 220, 230, 380, 400, 415, 460, 480 and 575, and any frequency such as 50 or 60 Hz. Indeed, the primary could have capped windings or extended windings such that the same transformer can accommodate multiple input voltages.

The output of secondary windings S1–S3 is provided to rectifier stage 106 which includes diode bridge 107 and capacitor 108. Diode bridge 107 includes 6 diodes 207 and capacitor 108 has, in the preferred embodiment, a large value (24,000 mfd) and is charged to 85 V. Capacitor 108 filters the dc rectified signal to produce a filtered dc signal of about 85 v between the positive bus and negative bus.

The output of rectifier stage 106 (the positive bus and negative bus) is provided as the input to the buck converter stage 111, sometimes called a chopper. In this embodiment buck converter stage 111 is comprised of a switch (MOSFET) Q1, a diode D4 and an inductor L1. As one skilled in the art will recognize other electronic components having the ability to control current flow (a current gate) may be used in place of MOSFET Q1 and/or diode D4.

Buck converter stage 111 performs a function analogous to a dc transformer. In other words it receives as an input the 85 V dc supply and provides a substantially dc output having a controllable adjustable magnitude. MOSFET Q1 is switched on and off at a frequency much higher than the line frequency. In one unique embodiment, this frequency varies from 24 kHz at high current demand to 60 kHz at low current demand. The relationship between the switching frequency of MOSFET Q1 and the output current will be explained in greater detail below.

Generally speaking the buck regulator controls the current by pulse with modulation (PWM). In a PWM controller the output is a function of the ratio of on time to off time at the given frequency. If this on time to off time ratio is large, the PWM will produce high power. If it is low, it will produce low power.

The output of buck converter stage 111 is provided to inverter stage 117. Inverter stage 117 comprises a plurality of switches Q3–Q6, and provides its output to a load 208. To understand the operation of buck converter stage 111 it is necessary to consider the state of the switches in inverter stage 117. For example, assume that switches Q3 and Q6 are on, thereby providing current to load 208. When MOSFET Q1 is turned on the 85 V bus will be switched across diode D4. Diode D4, of course, is blocking, thus this voltage appears across switches Q3–Q6 (IGBTs in the preferred embodiment). Because switches Q3 and Q6 are on, positive current will flow through switch Q3, arc load 208, switch Q6 and inductor L1. If inductor L1 was not present the current flow would be approximately equal to 85 V divided by the load impedance. In the case of an arc load, this impedance is very low, thus the current would be extremely high and essentially out of control.

Thus, the function of inductor L1 is to buck this current and, while doing so, store energy. By bucking the current, the current flow through load 208 is controlled and regulated to a relatively slow rising value. Also, as the current increases a magnetic field is induced in inductor L1, thus storing energy therein. In other words, inductor L1 filters pulse width modulated voltage pulses supplied by MOSFET Q1, and provides predetermined rising and falling current slopes to the arc through output inverter stage 117.

When Q1 is switched on, the 85 V bus is connected to the arc load in series through inductor L1 and output inverter stage 117. The filtering function of L1 will cause the output current to change at a rate equal to the forcing voltage applied to L1, multiplied by the on time of MOSFET Q1, divided by the inductance value of L1. Thus, the current will continue to rise so long as MOSFET Q1 stays on.

MOSFET Q1 is turned off after a time determined by the desired load current flow and the actual load current flow. When MOSFET Q1 is switched off, the arc or load current will continue to flow, but will be diverted through freewheeling diode D4, and again the filtering function of L1 will cause the arc current to decrease at a rate determined by the forcing voltage applied to L1, multiplied by MOSFET Q1 off time, divided by the inductance of inductor L1. The forcing voltage applied to inductor L1 when MOSFET Q1 is off is the arc or load voltage plus all series voltage drops in the current path. When MOSFET Q1 is off, the current flows from point A through diode D4, switch Q3, load 208, switch Q6, and back to inductor L1.

In summary, as long as MOSFET Q1 is on the magnitude of the output current increases, and as long as switch Q1 is off the magnitude of the output current decreases. Thus, by turning MOSFET Q1 on and off at regular intervals, it is possible to regulate the load current.

The control of MOSFET Q1 utilizes a saw tooth wave, a feedback signal, and a reference current signal. A saw tooth wave signal is generated in accordance with well known prior art, and is used to turn on MOSFET Q1 at regular intervals. Also, for any given desired output current, a reference current signal is established. The reference current signal is compared to a feedback signal representing actual current to generate an error signal. MOSFET Q1 is then turned off whenever the output current reaches a predetermined value as determined by the reference current signal compared to the load current signal.

As one skilled in the art will recognize, this load current will have somewhat of a triangular wave shape, rising during the time MOSFET Q1 is on and falling during the time MOSFET Q1 is off. The amplitude of the rise and fall can be determined by the switching frequency of MOSFET Q1, the on time to off time ratio of MOSFET Q1, the size of the inductor L1, the source voltage and the load voltage.

The triangular wave shape may be seen in FIG. 3, which shows the state of MOSFET Q1 and the output current through load 208 for both high and low output currents. FIG. 3A shows the state of MOSFET Q1 for a high output current. It may be seen that switch Q1 is on for a relatively large portion of time (approximately 75 percent of each complete cycle). As shown in FIG. 3B the corresponding output current is relatively high and rises during the time switch Q1 is on, and falls during the time switch Q1 is off.

Similarly, FIGS. 3C and 3D show the state of switch Q1 and the output current for a low output. It may be seen in FIG. 3C that switch Q1 is off for a relatively large portion of time (approximately 85% of the time). It should be noted that as shown in FIG. 3 the time of one complete cycle (on time plus off time) of switch Q1 is the same for high and low currents. In one embodiment the switching frequency of switch Q1 will vary, depending upon the magnitude of the output current.

As shown in FIG. 3D the rise time is sufficiently less than the fall time for such a low output current, so the output current reaches zero prior to the switching on of switch Q1, causing current discontinuities in load 208. Such current discontinuities are common in the prior art and are not acceptable for welding applications.

In accordance with one embodiment of the present invention the switching frequency of switch Q1 is increased as the current decreases to prevent such current discontinuities. The frequency is determined through practice when considering the desired output, the inductor size, the conduction losses in switch Q1, the switching losses of switch Q1, losses of the snubbers that are required for switching of switch Q1, the ripple tolerance in load current, and other well known engineering factors.

The inventors have, through practice, determined that a design using an inductor L1 of size between 1.0 and 1.5 millihenrys and an 85 V supply bus the following frequency versus current parameters are suitable:

| LOAD CURRENT | SWITCH Q1 FREQUENCY |
| --- | --- |
| 1 AMP | 60 kHz |
| 100 AMPS | 50 kHz |
| 200 AMPS | 40 kHz |
| 300 AMPS | 30 kHz |
| 400 AMPS | 20 kHz |

The embodiment of FIG. 2 is able to provide either polarity dc output, or an ac output with adjustable balance and independent amplitude control. It is readily seen how this may be accomplished by looking at the inverter switches Q3–Q6 and buck converter stage 111.

The load current flows in one direction when switches Q3 and Q6 are on (right to left on the schematic of FIG. 2), and in the opposite direction when switches Q4 and Q5 are on. There is no limit on how long switches Q3 and Q6 or switches Q4 and Q5 may conduct; the only limitation is that neither switches Q3 and Q5, nor switches Q4 and Q6, may be on together. In other embodiments the switches may be on together for a brief period of time. Thus, if a dc output is desired either switches Q3 and Q6 are left on and switches Q4 and Q5 off, or visa versa, depending upon the polarity desired.

An ac output is obtained by turning switches Q3 and Q6 on and switches Q4 and Q5 off, and then reversing the process. The width of each half cycle is determined by the length of time the switches are on and off. It is readily seen that there is no need to control switches Q3 and Q6 such that they are on the same length of time switches Q4 and Q5 are on. Accordingly, an output having adjustable balance is provided. In the preferred embodiment it is desirable to have the ac adjustable from 40 to 400 Hz, although other frequencies are easily obtainable.

Similarly, the output can be made asymmetrical with respect to current. If the reference current signal that controls switch Q1 is set so that it has one value when switches Q3 and Q6 are conducting and another value when switches Q4 and Q5 are conducting, the load current magnitude may be separately controlled on each half cycle of ac output. This makes the output independently controllable on each half cycle with respect to both duration and amplitude of each half cycle.

The fast and controllable switching of this design also makes it possible to utilize the thermionic emission characteristics of electrode positive to start ac welding. Even if the dc electrode negative welding is desired, inverter stage 117 can be controlled to provide a short burst of electrode positive to very quickly heat the electrode until it becomes thermionic, and then switch to electrode negative after the arc has been established for heat flow to the work to obtain a penetrating weld. Similarly, the control can be used to enhance starts of ac arcs by always bringing on an extended period of electrode positive time to establish the arc. The electrode positive time is determined by factors such as tungsten, size, geometry, torch type and material thickness.

Figure 4:
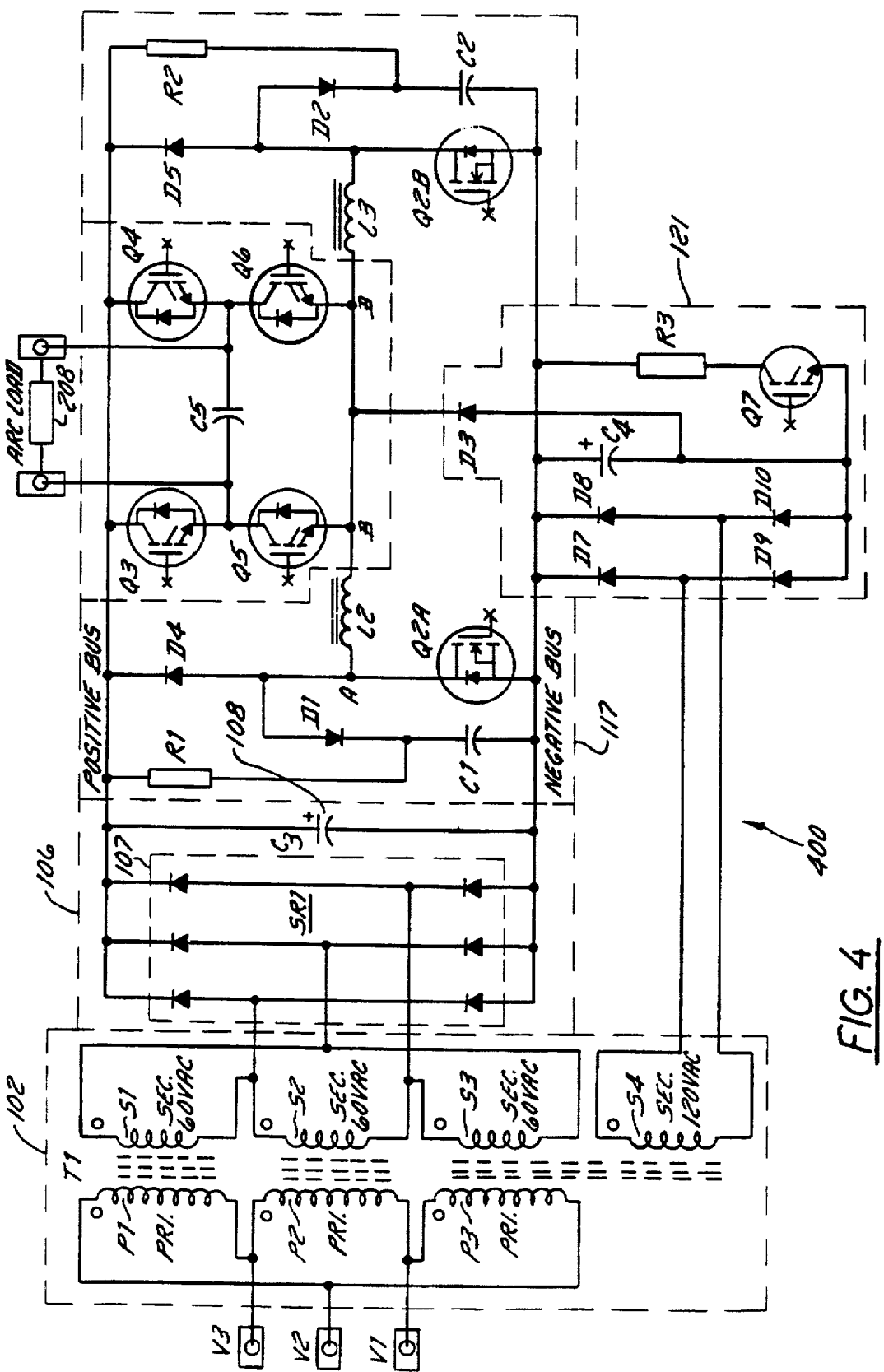
FIG. 4 is a circuit diagram of a preferred embodiment of the inverter power supply constructed according to the present invention.

FIG. 4 shows a circuit diagram of an alternative embodiment 400 implementing the block diagram of FIG. 1. Transformer stage 102 includes three primary windings P1–P3 and three secondary windings S1–S3. As in the configuration of FIG. 2 primary windings P1–P3 are connected to a three-phase voltage input V1–V3, and secondary windings S1–S3 produce a 60 V ac output. Also as in the embodiment of FIG. 2, rectifier stage 106 includes a rectifier bridge 107 comprised of six diodes 207, and a capacitor 108. The output of rectifier stage 106 is a filtered dc output as shown at 110 of FIG. 1, and is provided as the positive and negative bus.

In the embodiment of FIG. 4, buck converter stage 111 is separated into two circuits. This limits the number of MOSFETS that need to be in parallel to handle the necessary current. Accordingly, buck converter stage 111 includes a pair of inductors L2 and L3, a pair of switches Q2A and Q2B, a snubber circuit for switch Q2A comprising a resistor R1, a diode D1 and a capacitor C1, and a snubber circuit for switch Q2B comprising a resistor R2, a diode D2 and a capacitor C2. In one embodiment switches Q2A and Q2B each consist of three parallel MOSFETS.

Switches Q2A and Q2B are preferably MOSFETS, but may be any suitable switching device, and chop the positive and negative bus to provide a chopped dc signal in the kilohertz range, just as MOSFET Q1 functioned in the embodiment of FIG. 2. The chopping (switching on and off) is timed with a saw tooth oscillator, a feedback signal and a reference current signal to control the on and off time of switches Q2A and Q2B to keep the magnitude of smoothed dc signal 116 at the desired level. Switches Q2A and Q2B have separate sawtooth oscillators that are synchronized to be at 180 electrical degrees from one another. This has the advantage of reducing the ripple current in the arc to 50% or less of the ripple currents found in either inductor L2 or L3.

Also as previously described in conjunction with FIG. 2, the chopping frequency may be variable, and depend upon the desired output current. Inductors L2 and L3 together function as inductor L1 did in the embodiment of FIG. 2. They buck the current to control and limit it, and while doing so store energy to be returned when switches Q2A and Q2B are turned off.

As in FIG. 2, the buck converter stage 111 provides smoothed dc signal 116 to inverter stage 117. Inverter stage 117 is identical to that shown in FIG. 2, with the addition of a capacitor C5 to protect switches Q3–Q6 from excessive dv/dt. Switches Q3–Q6 switch the current across the load as in the embodiment of FIG. 2, to provide an ac output having an adjustable balance and independent amplitude control, or a dc output of either polarity.

Even utilizing the variable frequency chopping as described in conjunction with FIG. 2 it is possible for inductors L2 and L3 to "run out" of energy at low current (50 amps or less e.g.) and cause a current discontinuity. One way to prevent this is to pump up inductors L2 and L3 just prior to polarity change. This may be accomplished by creating a relatively high pulse of current just before polarity change (called an increasing pre-commutation pulse). In the embodiment of FIG. 4 the "pumping up" is accomplished by creating a pulse in the reference current signal corresponding to about 50 amps, that starts 250 microseconds prior to polarity reversal. The pulse in the reference current signal causes buck converter stage 111 to try and create a 50 amp pulse in the output current.

However, as one skilled in the art will recognize inductors L2 and L3 will cause this pulse to have a relatively slow rise time, but during this current rise considerable energy is stored in inductors L2 and L3. Indeed, the magnitude and width of the pulse are chosen so enough energy is stored in inductors L2 and L3 to prevent current discontinuity at output currents as low as 1 amp. Of course, other minimum thresholds could be selected.

Another benefit of providing such a current pulse is that it will create a similar initial current pulse after the current reversal, thereby assisting reignition of the next half cycle. As stated above, the inventors have determined that for the embodiment of FIG. 4 a pulse of 250 microseconds is sufficient. This is very short when compared to the 40 to 400 Hz (25–2.5 milliseconds) switching frequency of Q3–Q6 and the output current. Thus, this increasing pre-commutation pulse adds very little to the RMS value of the output current.

Referring now to FIG. 5 the effect of pumping up inductors L2 and L3 is graphically shown. FIG. 5A shows the output of buck converter stage 111, with the 50 amp pulse provided at the end of each load cycle. As can be seen on FIG. 5A a current reference signal corresponding to a 1 amp output level is maintained until just prior to the current reversal. Then a narrow pulse in the current reference signal that corresponds to a 50 amp output is provided. As shown in FIG. 5B, the current reference signal pulse causes a current spike to be applied to the load immediately prior to reversal. A similar current spike is also created after load current reversal. Thus, the reference current signal pulse helps avoid output current discontinuities and the ensuing opposite polarity output spike helps reignite the arc.

In accordance with another aspect of the present invention, the reference current is pulsed to a lower magnitude when the power supply is delivering a high load current. As stated above, at high load currents, the acoustic noise caused by current reversals may be significant. Because the acoustic noise is dependent upon the magnitude of the output current, it is possible to decrease the noise by "pulsing" down (called a decreasing pre-commutation pulse) the reference current signal immediately prior to current reversal. As in the case of the increasing pre-commutation pulse applied above to "pump up" the inductor, this decreasing pre-commutation pulse will have very little effect on the RMS value of the output current. Moreover, because the output current is a high current, the problems associated with arc rectification at reversal discussed above with respect to low output currents are not present.

The inventors have determined that a pulse width of 270 microseconds is sufficient to reduce acoustic noise. Additionally, the reference current is pulsed to a level corresponding to 50 amps. However, for high outputs (300 amps or more), the output current will decrease, but not all the way to 50 amps, due to slewing in the power supply.

During current reversal through the load, inductors L2 and L3 oppose the distributed inductance in the load, such as that found in cables, the arc and coupling coils. This causes inductors L2 and L3 to produce a high voltage that is applied across the load and IGBTs Q3–Q6. While the voltage aids in reversing the current, if left unchecked a high voltage could damages IGBTs Q3–Q6. For example, IGBTs having a voltage rating of 600 V are typical, but the voltage briefly generated by inductors L2 and L3 to oppose the distributed load inductance may easily surpass 600 V. Thus, another feature of the present power supply is that a high forcing voltage is provided to aide at current reversal, but the voltage is clamped to a safe value.

Clamp stage 121 and clamp secondary winding S4 were provided to protect IGBTs Q3–Q6 from such an overvoltage. Clamp secondary winding S4 on transformer T1 provides a 120 V ac output. The 120 V output is provided to clamp stage 121 to produce a rectified 165 volt output. Clamp stage 121 includes diodes D7–D10 arranged in a bridge configuration to rectify the transformed ac input signal. The 165 volt rectified output is provided to a capacitor C4, which charges to provide a 165 v dc filtered signal.

The positive side of capacitor C4 is connected to the negative bus of power supply 400. Thus, the negative side of capacitor C4 will be approximately −165 V (after charging) with respect to the negative bus of power supply 400. Under conditions other than a current reversal, a diode D3 blocks the voltage on capacitor C4 from being applied to the arc load or the inverter stage 117. When a reversal of the arc occurs, the 165 V DC signal is stacked with the 85 V DC bus to clamp the voltage across inductors L2 and L3, and thus across IGBTs Q3–Q6 to approximately 240 V. Thus, the voltage is sufficiently high to stabilize the arc, and not so high as to damage IGBTs Q3–Q6.

In operation, if switches Q3 and Q6 are conducting with current flowing from the electrode to work as when welding, inductors L2 and L3 would have current flow in their windings creating a magnetic field and a level of stored energy therein. If switches Q3 and Q6 are turned off, inductors L2 and L3 will act in concert to continue a current flow. Because the current path through the arc is no longer available, inductor L1 will try to push current from point A through diode D4, to the positive bus, through capacitor 108 to the negative bus, and through capacitor C4 and diode D3 and back to point B. Similarly, inductor L2 will try and push current from point C through a diode D5, capacitor 108, capacitor C4, diode D3 and back to point B. This drives the voltage at point b down. When the voltage at point B decrease more than one diode drop below the voltage at the negative side of capacitor C4 (about 250 volts), diode D3 becomes forward biased and the voltage across IGBTs Q3–Q6 is clamped at 250 volts.

In the preferred embodiment capacitor 108 has a large value (24,000 mfd) and is charged to 85 volts. Capacitor C4 has a much smaller value (preferably approximately 1,000 mfd) but is charged to approximately 165 volts. As stated above when diode D3 is conducting capacitors 108 and C4 are in series and connected across point B and the positive bus. This advantageously uses the supply voltage as part of the clamp voltage.

In practice a five microsecond delay between turning off one pair of transistors Q3–Q6 and a turn on of the next pair of transistors is used. The five microsecond delay accommodates the lumped circuit distributed impedance and resonances. It also allows time for switches Q2A and Q2B to respond to the new current reference signals.

Because it is difficult to balance the stored energy in inductors L2 and L3 throughout the range of the output current level, capacitor C4 will have a tendency to pump up to a value that could exceed component ratings. Therefore, a switch Q7 and a resistor R3 are provided to limit the voltage on capacitor C4. This circuit allows capacitor C4 to pump up to approximately 270 v. When the voltage exceeds 270 V across capacitor C4, voltage sense circuitry will cause switch Q7 to conduct through resistor R3 and reduce the voltage to about 230 V. Additionally, the decreasing pre-commutation pulse described above reduces energy build up on capacitor C4. This helps reduce the amount of wasted power when switch Q7 is on and heat is dissipated in resistor R3.

As one skilled in the art should recognize, unless inductors L2 and L3 are acting as voltage sources diode D3 will be back biased. Thus, the present invention will only produce the increased (but clamped) re-strike voltage when inductors L2 and L3 have been conducting current, i.e only when the arc has been present. This is a great advantage because it can produce a pseudo open circuit voltage of nearly 250 V while operating in a loaded or arc on condition, but will revert rapidly to the safe value of 85 v dc when there is no arc. Moreover, because a dc voltage is always applied to the terminals when not welding or when the power source is at open circuit voltage, the present invention takes advantage of the additional safety factor of dc when compared to ac.

Thus, it should be apparent that there has been provided in accordance with the present invention a controllable inverter power supply that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A power supply for providing an output to a load comprising:

a first source of dc power having a first non-zero voltage;

a converter in electrical communication with the source of dc power and capable of being connected to the load;

a second source of dc power having a second non-zero voltage; and at least one controllable switch, capable of connecting the first and second sources of dc power, in an additive, and non-parallel arrangement across the input of the converter, wherein the voltage applied to the converter input is the sum of the voltages of the first and second non-zero voltages.

2. The power supply of claim 1 wherein the first source of dc power has a first voltage magnitude and the second source of dc power has a second voltage magnitude, wherein the second magnitude is greater than the first magnitude.

3. The power supply of claim 1 including a control circuit, wherein the switch is controlled to connect the first and second sources of dc power in series with the load at every current reversal of the output.

4. The power supply of claim 1 wherein:

the first source of dc power includes a buck converter comprising the controllable switch and at least one inductor;

a source of dc voltage having a positive and a negative bus is provided as an input to the buck converter; and the switch is connected between the inductor and one of the voltage source buses.

5. The power supply of claim 4 wherein the buck converter is comprised of two switches and two inductors.

6. The power supply of claim 5 wherein the two switches are MOSFETs.

7. The power supply of claim 4 wherein the source of dc voltage comprises a three phase transformer, a rectifier connected across the transformer, and at least one capacitor connected across the rectifier.

8. The power supply of claim 4 wherein the converter is capable of providing an ac or a dc output.

9. The power supply of claim 4 wherein the buck converter provides a current output of adjustable magnitude, and the switch has a control input, further wherein a variable frequency saw tooth wave generator is connected to the control input, whereby the switch is turned on at the frequency of the saw tooth wave, and further wherein the frequency is inversely related to the desired current output magnitude.

10. A power supply for providing an ac output to a load comprising:

a converter having a source of first source of non-zero dc voltage;

an inductor in series with the converter;

a second source of non-zero dc voltage;

and a switch capable of connecting the substantially dc voltage and the second source of dc voltage in an additive, non-parallel arrangement across the input of the converter, wherein the voltage across the converter is clamped by the first and second dc source of voltage, and wherein the voltage applied to the converter input is the sum of the voltages of the first and second sources.

11. The power supply of claim 10 wherein the second source of dc voltage comprises:

a secondary winding on the transformer;

a rectifier connected across the secondary winding; and a capacitor connected across the rectifier.

12. The power supply of claim 11 wherein the switch is a diode and connects the capacitor in series with the first source of dc voltage.

13. The power supply of claim 11 wherein the second source of dc voltage is a voltage source of between 165 volts and 270 volts.

14. The power supply of claim 11 including a three phase transformer having a leakage reactance sufficient to provide a power factor of at least 0.9, the transformer providing an output to a rectifier having an output that is the first source of dc power.

* * * * *